United States Patent
Brandt et al.

(10) Patent No.: US 10,054,792 B2
(45) Date of Patent: Aug. 21, 2018

(54) WINDSHIELD OF A MOTOR VEHICLE, A SYSTEM WITH A WINDSHIELD AND A MOTOR VEHICLE

(71) Applicant: GM GLOBAL TECHNOLOGY OPERATIONS LLC, Detroit, MI (US)

(72) Inventors: Peter Brandt, Ruesselsheim (DE); Heiko Charle, Ruesselsheim (DE); Georg Bauer, Ruesselsheim (DE); Rolf Mitschke, Ruesselsheim (DE); Peter Kahler, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 15/381,924

(22) Filed: Dec. 16, 2016

(65) Prior Publication Data

US 2017/0174082 A1 Jun. 22, 2017

(30) Foreign Application Priority Data

Dec. 16, 2015 (DE) .................. 10 2015 016 281

(51) Int. Cl.
*G02B 27/01* (2006.01)
*H02J 50/10* (2016.01)
*B60K 35/00* (2006.01)

(52) U.S. Cl.
CPC .............. *G02B 27/01* (2013.01); *B60K 35/00* (2013.01); *G02B 27/0101* (2013.01); *H02J 50/10* (2016.02); *G02B 2027/0194* (2013.01); *G09G 2380/02* (2013.01); *G09G 2380/10* (2013.01)

(58) Field of Classification Search
CPC .......................... G02B 27/01–27/0189; G02B 2027/0105–2027/0198; B60K 2350/20; B60K 2350/203; B60K 2350/2056; G09G 2380/02; G09G 2380/10; G09G 2330/02
See application file for complete search history.

(56) References Cited

U.S. PATENT DOCUMENTS

| 8,264,469 | B2* | 9/2012 | Kimura ................... G06F 3/044 178/18.01 |
| 9,604,565 | B2* | 3/2017 | Prasad ..................... B60Q 1/00 |
| 9,755,300 | B2* | 9/2017 | Kagaya ................ H01Q 1/1285 |
| 2011/0025584 | A1 | 2/2011 | Nishigasako et al. |
| 2012/0091923 | A1 | 4/2012 | Kastner-Jung et al. |
| 2014/0049882 | A1* | 2/2014 | Lin ......................... H05K 7/00 361/679.01 |

(Continued)

FOREIGN PATENT DOCUMENTS

DE 102007012571 A1 1/2008

*Primary Examiner* — Gene W Lee
(74) *Attorney, Agent, or Firm* — Lorenz & Kopf, LLP

(57) ABSTRACT

A windshield for a motor vehicle with a display unit is disclosed. The windshield is realized in the form of a laminated glass pane with at least an outer pane, an inner pane and an intermediate compound foil. The display unit is arranged between the outer pane and the inner pane, wherein the display unit features a flexible printed circuit and at least one display element arranged on the flexible printed circuit, as well as a secondary coil. The secondary coil is designed for making available electrical energy, which is inductively coupled into the secondary coil, in order to supply the display unit with energy. The present disclosure furthermore relates to a system, as well as a motor vehicle.

16 Claims, 2 Drawing Sheets

(56) References Cited

U.S. PATENT DOCUMENTS

| | | |
|---|---|---|
| 2015/0103280 A1 | 4/2015 | Wang |
| 2015/0232030 A1* | 8/2015 | Bongwald ................. B60R 1/00 348/115 |
| 2016/0006112 A1* | 1/2016 | Kagaya ................ H01Q 1/1285 343/712 |
| 2017/0141566 A1* | 5/2017 | Morita ................... H02H 9/045 |

* cited by examiner

WINDSHIELD OF A MOTOR VEHICLE, A SYSTEM WITH A WINDSHIELD AND A MOTOR VEHICLE

CROSS-REFERENCE TO RELATED APPLICATION

The application claims priority to German Patent Application No. 102015016281.0, filed Dec. 16, 2015, which is incorporated herein by reference in its entirety.

TECHNICAL FIELD

The present disclosure pertains to a windshield for a motor vehicle, a system with a corresponding windshield, as well as a motor vehicle with a corresponding windshield, are described below.

BACKGROUND

Nearly all motor vehicles feature windshields that are arranged in front of a driver referred to the driving direction. In a few motor vehicles, relevant information for the driver has also been made available in the windshield for quite some time. In this way, the information is directly displayed in the driver's field of vision. This information may include operationally relevant information such as speed or navigation instructions, but may also consist of warnings, e.g., for alerting the driver of a collision hazard. Due to information of the first type, which is displayed in the windshield, the driver no longer has to look at the instrument panel in order to acquire the corresponding information and therefore can constantly monitor the traffic. Information of the second type makes it possible to detect hazardous situations earlier such that the driver may initiate countermeasures if necessary.

It is furthermore known that certain vehicles, particularly emergency vehicles, taxis or the like, require display units that are directed outward.

Inwardly directed display units may be realized on the basis of two different constructive principles, namely in the form of projecting displays, which are commonly referred to as heads-up displays, or in the form of direct displays. Heads-up displays have an elaborate construction because the lighting unit requires much space in the dashboard. In addition, different dashboard variations and windshield variations have to be developed. Direct displays may be directed inward as well as outward. The realization of corresponding display units requires an energy supply and, under certain circumstances, a control of the display elements. If the display units are integrated into the windshields, this means that wiring has to lead out of the windshields in display units known from the prior art. Consequently, the installation of corresponding windshields, as well as the subsequent contacting, is quite complicated. In addition, the contacting has to be realized through the water box such a reconstruction of the water box and additional sealing measures are required and the construction effort and therefore the costs are correspondingly increased.

SUMMARY

The present disclosure therefore enhances windshields and motor vehicles of the initially described type in such a way that a display unit with simple contacting can be realized. A windshield for a motor vehicle with a display unit is described below, wherein the windshield is realized in the form of a laminated glass pane with at least an outer pane, an inner pane and an intermediate compound foil. The display unit is arranged between the outer pane and the inner pane. The display unit features a flexible printed circuit and at least one display element arranged on the flexible printed circuit, as well as a secondary coil. The secondary coil is designed for making available electrical energy, which is inductively coupled into the secondary coil, in order to supply the display unit with energy.

Due to the inductive design, the windshield with the display unit can be manufactured in the form of a self-contained system and installed like a conventional windshield. Any wiring of the display unit is eliminated due to the inductive energy coupling such that the constructive design, for example, of the water box and other components affected by conventional constructions does not have to be modified. Instead, it suffices to operate the display unit inductively such that the constructive effort can be reduced.

Energy for supplying the at least one display element can be inductively received via the secondary coil that can be coupled to a primary coil arranged outside the windshield.

In this way, the display unit can be preassembled and installed in the form of a module during the manufacture of the laminated glass pane. The flexible printed circuit may be transparent. The flexible printed circuit may represent an additional foil layer. The flexible printed circuit may furthermore be connected to the outer pane or the inner pane on the one hand and to the compound foil on the other hand, but the flexible printed circuit may also be arranged between two compound foils.

In a first enhancement, the flexible printed circuit may be fixed on the compound foil. In this case, the flexible printed circuit and the compound foil form an assembly unit. In this way, the assembly of the windshield is simplified in comparison with two separate foils.

In another enhancement, the flexible printed circuit may replace the compound foil in certain areas. In this case, the compound foil may be provided with a corresponding cutout, into which the flexible printed circuit can be inserted.

In another enhancement, the secondary coil may be arranged in the flexible printed circuit. The structural height can thereby be reduced. The flexible printed circuit may feature corresponding recesses for arranging the secondary coil in the flexible printed circuit.

In another embodiment, the flexible printed circuit may be composed of multiple layers. The secondary coil is formed by strip conductors on the multiple printed circuit layers. The components of the display unit have to be flat because the maximum structural height available for a windshield is limited. This is particularly problematic with respect to secondary coils because they require a corresponding structural height. The space requirement can be minimized by integrating the secondary coil into different printed circuit layers.

In another enhancement, the display unit includes a luminous display unit and the at least one display element is realized in the form of a lighting element or a lighting element that can be activated in different colors. This makes it possible to also display the corresponding information in a dark environment, particularly at night. In addition, the contrast of the display unit can be increased with lighting elements. The energy demand can be limited with modern lighting elements such as, for example, diodes (LEDs) or other highly efficient lighting means. This allows a more compact design of the secondary coil.

Multiple display elements may be provided instead of a single display element. If lighting elements are provided, it is possible to provide multiple lighting elements that can be activated in the same color, in different colors or in multiple colors.

In another enhancement, a display unit control for activating individual display elements and an inductive signal input for transmitting control signals may be provided. The control unit may be relatively rudimentary because it is only required for activating the display elements.

In an embodiment, the display unit may be arranged in the field of vision of the driver, but outside a visual area to be kept clear.

In an enhancement, the display unit may be arranged in a black print of the windshield. At this location, the display contrast is very high such that the displayed information can be quickly perceived the acquired by the driver. This simplifies the arrangement of other components such as cooling surfaces, among other things, for lighting.

The windshield makes it possible to realize a warning system, particularly a collision warning system that alerts a driver of potential collision hazards. Depending on the specific design, a simple warning can be issued by activating the at least one display element. For this purpose, it suffices to switch on an energy supply that activates the display element via the inductive coupling. In other embodiments, more complex warnings can be issued with different blinking patterns, colors and/or display patterns.

According to an embodiment, multiple lighting elements are arranged, e.g., in a row and all or some of the lighting elements can be activated simultaneously such that, for example, only the left, only the central or only the right lighting elements of the row can be illuminated in order to respectively alert the driver of a collision hazard from the left side, the center or the right side. If the lighting elements can be activated in multiple colors, it is furthermore possible to display the hazard level, wherein green may indicate, e.g., a minor hazard, but the need to be cautious, yellow may indicate a medium hazard and red may indicate an impending collision if no countermeasures are initiated. For this purpose, the display means may be operated continuously or in a blinking fashion in certain embodiments.

In another aspect, the present disclosure includes a system with a windshield as described above and a primary coil that is designed for inductively coupling electrical energy into the secondary coil in order to supply the display unit with energy.

A first enhancement of the system features a control unit for activating the primary coil. A corresponding control unit makes it possible to switch the primary coil on and off and therefore to activate or deactivate the inductive energy transmission.

In enhancements, the control unit may be configured to transmit control signals to the display unit, e.g., via the primary coil or via other transmission systems.

In another aspect, the present disclosure provides a motor vehicle with a windshield of the type described above and an energy supply. A corresponding motor vehicle makes it possible to provide an inductively coupled display unit in a windshield. The energy supply can thereby be significantly simplified in comparison with conventional windshields with integrated display units.

In a first enhancement, a data transmitter for the display unit may be provided. In this way, more complex display patterns can be realized.

In another enhancement, the energy supply and/or the data transmitter may be realized in the form of a primary coil. If the primary coil fulfills both functions, control signals can be transmitted, e.g., with different frequencies or frequency patterns.

In another enhancement, the primary coil may be arranged on a bracket in a spring-mounted fashion. In this way, the primary coil can be positioned relative to the secondary coil, wherein the spring mounting results in insensitivity to shocks.

In another enhancement, the primary coil may be arranged on the windshield opposite of the secondary coil. In this way, the transmission path between primary coil and secondary coil can be minimized.

According to another enhancement, the primary coil can be brought in contact with the windshield by means of the bracket. In this way, a reliable signal transmission and energy supply can also be ensured if vibrations occur while driving.

According to another enhancement, the primary coil is connected to a control. In this case, the primary coil can be directly activated by the control.

Other characteristics and details can be gathered from the following description, in which at least one exemplary embodiment is elucidated in greater detail and with reference to the drawings. Described and/or graphically illustrated characteristics form the object of the present disclosure individually or in any sensible combination, if applicable also independently of the claims, and particularly may also form the object of one or more separate applications.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
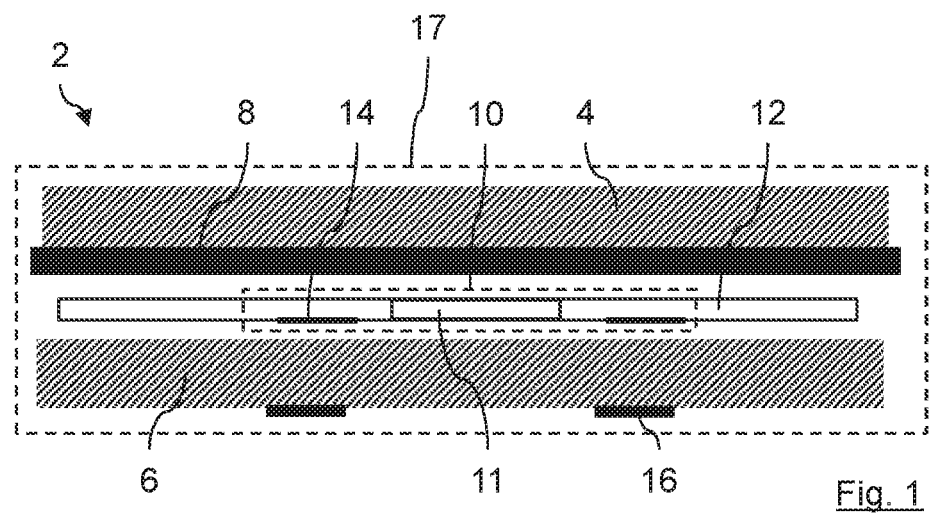
FIG. 1 shows an exploded view of a cross section through a windshield.

FIG. 1 shows an exploded view of a cross section through a windshield 2. The windshield 2 features an outer pane 4, an inner pane 6 and a compound foil 8 that connects the outer pane 4 and the inner pane 6 to one another.

A luminous display unit 10 is arranged between the inner pane 6 and the compound foil 8. The luminous display unit 10 may be arranged in the region of a black print of the windshield 2 such that the displayed information has a high contrast and can be easily perceived. The luminous display unit 10, which is explained in greater detail below with reference to FIG. 4, features a luminous display 11 that is applied on a flexible printed circuit 12 (frequently referred to as FPC-foil (Flexible Printed Circuit)). The luminous display 11 may feature lighting elements.

The luminous display unit 10 furthermore features a secondary coil 14 for receiving energy from a primary coil 16 that does not form part of the windshield 2, but is in contact with this windshield, in order to supply the luminous display unit 10 with electrical energy. In some embodiments, control signals for controlling the luminous display unit 10 can be received via the secondary coil 14.

The windshield 2, the luminous display unit 10 and the primary coil 16 jointly form a system 17.

Figure 2:
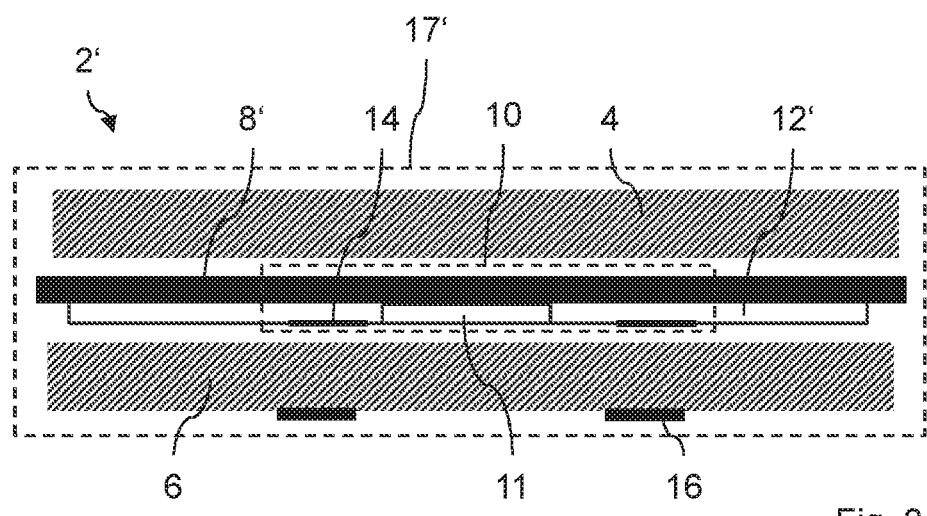
FIG. 2 shows an exploded view of a cross section through an alternative embodiment of a windshield.

FIG. 2 shows an exploded view of a cross section through an alternative embodiment of a windshield 2'. In this embodiment, a flexible compound foil 8' with a flexible printed circuit 12' fixed thereon is used instead of a separate compound foil and connected to the outer pane 4 and the inner pane 6.

The windshield 2', the luminous display unit 10 and the primary coil 16 jointly form a system 17'.

Figure 3:
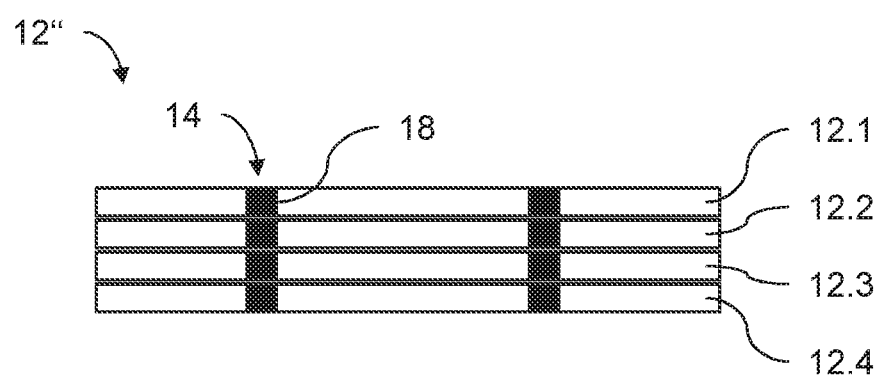
FIG. 3 shows a cross section through a flexible printed circuit with a secondary coil.

FIG. 3 shows a cross section through a potential embodiment of a flexible printed circuit in the form of a multilayer printed circuit 12". The flexible multilayer printed circuit 12" features multiple layers 12.1-12.4, on which strip conductors 18 forming the secondary coil 14 are respectively applied. In this way, the secondary coil 14 can be designed very compact and realized with a thickness of no more than 0.8 cm. The flexible multilayer printed circuit 12" may be realized in the form of a flexible printed circuit 12 according to FIG. 1, as well as in the form of a flexible compound printed circuit of the type described with reference to FIG. 2.

Figure 4:
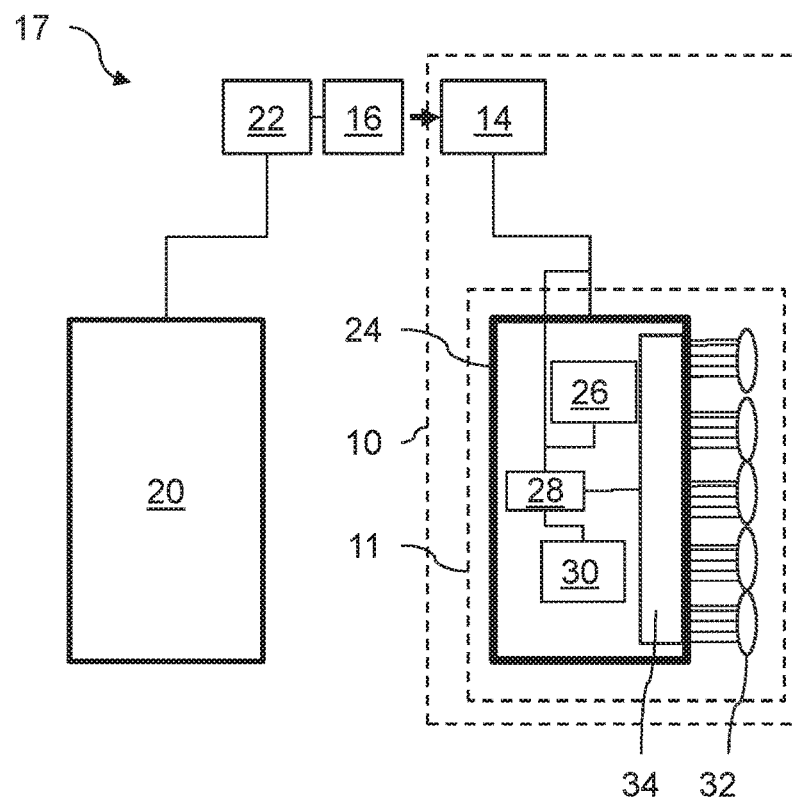
FIG. 4 shows a circuit diagram of a system.

FIG. 4 shows a schematic structure of the system 17. The control unit 20 that operates the primary coil 17 is provided on the motor vehicle side. A DC/AC converter 22 is provided upstream of the primary coil and converts the signals accordingly. On the secondary windshield side, the signals are received by the secondary coil 14 and forwarded to a control unit 24.

The control unit 24 features an oscillator 26, a serial peripheral interface 28 and the memory 30, which convert the signals received via the secondary coil 14 into control signals and electrical energy for light-emitting diodes 32. The light-emitting diodes 32 may be multicolor light-emitting diodes such as RGBW-LEDs that can be activated in multiple colors. An LED driver 34 is provided for operating the light-emitting diodes 32.

Figure 5:
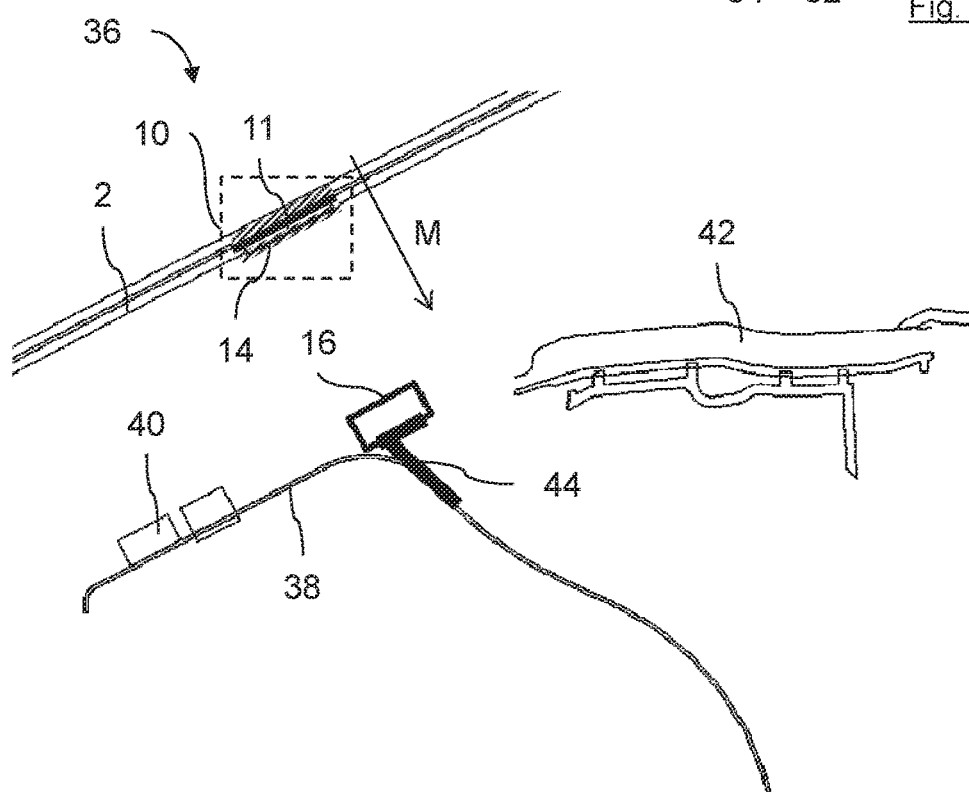
FIG. 5 shows a longitudinal section through an exploded view of a motor vehicle with windshield and dashboard.

FIG. 5 shows a cross section through an exploded view of a motor vehicle 36. The windshield 2 is inserted in an installation direction M and held by a retaining structure 38. A support 40 is provided for this purpose.

A bracket 44 for the primary coil 16 is provided between the retaining structure and a dashboard 42. The bracket 44 is realized elastically in order to provide the primary coil 16 with certain flexibility in the installation direction M. Once the windshield 2 is installed, intimate contact and a small spacing between the primary coil 16 and the secondary coil 14 can be achieved due to the elastic mounting of the primary coil 16 without having to fasten the primary coil 16 on the windshield 2 such that the installation is simplified. Furthermore, the spring pre-load also ensures reliable contact if vibrations or severe shocks occur.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A windshield for a motor vehicle comprising:
   a laminated glass pane with at least an outer pane, an inner pane and an intermediate compound foil;
   a display unit arranged between the outer pane and the inner pane, the display unit including a flexible printed circuit, at least one display element arranged on the flexible printed circuit and a secondary coil configured to inductively couple with a power source for powering the display unit.

2. The windshield according to claim 1, wherein the flexible printed circuit is fixed on the compound foil.

3. The windshield according to claim 1, wherein the secondary coil is arranged in the flexible printed circuit.

4. The windshield according to claim 3, wherein the flexible printed circuit comprises a plurality of layers and the secondary coil is formed by strip conductors on at least one of the plurality of layers.

5. The windshield according to claim 1, wherein the display unit comprises a luminous display unit and the at least one display element is a lighting element.

6. The windshield according to claim 5, wherein the lighting element comprises a multi-color lighting element configured to activate in multiple colors.

7. The windshield according to claim 1, further comprising a display unit control configured to activate the at least one display element, wherein the display unit includes an inductive signal input for transmitting control signals.

8. A system comprising a windshield according to claim 1 and a primary coil configured to inductively couple into the secondary coil for powering the display unit.

9. The system according to claim 8 further comprising a control unit configured to activate the primary coil.

10. A motor vehicle comprising a windshield according to claim 1 and an inductive power supply for powering the display unit.

11. The motor vehicle according to claim 10, further comprising a data transmitter configured to transmit control signals to the display unit.

12. The motor vehicle according to claim 11, wherein at least one of the inductive power supply or the data transmitter comprises a primary coil inductively coupled to the secondary coil.

13. The motor vehicle according to claim 12, wherein the primary coil is supported on a bracket in a spring-mounted fashion.

14. The motor vehicle according to claim 12, wherein the primary coil is arranged on the windshield opposite of the secondary coil.

15. The motor vehicle according to claim 14, wherein the primary coil is supported in contact with the windshield on a bracket in a spring-mounted fashion.

16. The motor vehicle according to claim 12, further comprising a control unit operably connected to the primary coil.

* * * * *